US012624160B2

(12) United States Patent
Anim-Danso

(10) Patent No.: US 12,624,160 B2
(45) Date of Patent: May 12, 2026

(54) LIQUID CRYSTAL POLYMER COMPOSITIONS, ARTICLES AND METHODS OF MAKING

(71) Applicant: Syensqo Specialty Polymers USA, LLC, Alpharetta, GA (US)

(72) Inventor: Emmanuel Anim-Danso, Atlanta, GA (US)

(73) Assignee: Syensqo Specialty Polymers USA, LLC, Alpharetta, GA (US)

( * ) Notice: Subject to any disclaimer, the term of this patent is extended or adjusted under 35 U.S.C. 154(b) by 415 days.

(21) Appl. No.: 18/250,603

(22) PCT Filed: Oct. 21, 2021

(86) PCT No.: PCT/EP2021/079214

§ 371 (c)(1),
(2) Date: Apr. 26, 2023

(87) PCT Pub. No.: WO2022/090051

PCT Pub. Date: May 5, 2022

(65) Prior Publication Data

US 2023/0399459 A1 Dec. 14, 2023

Related U.S. Application Data

(60) Provisional application No. 63/105,416, filed on Oct. 26, 2020.

(30) Foreign Application Priority Data

Jan. 8, 2021 (EP) .................................... 21150658

(51) Int. Cl.

| | |
|---|---|
| ***C08G 63/195*** | (2006.01) |
| ***C08K 3/22*** | (2006.01) |
| ***C08K 3/38*** | (2006.01) |
| ***C08K 7/14*** | (2006.01) |
| ***C08K 13/04*** | (2006.01) |
| ***H02K 3/30*** | (2006.01) |

(52) U.S. Cl.

CPC ............ *C08G 63/195* (2013.01); *C08K 13/04* (2013.01); *C08G 2250/00* (2013.01); *C08K 2003/2296* (2013.01); *C08K 2003/385* (2013.01); *C08K 7/14* (2013.01); *C08K 2201/014* (2013.01); *C08K 2201/019* (2013.01); *H02K 3/30* (2013.01)

(58) Field of Classification Search

None

See application file for complete search history.

(56) References Cited

U.S. PATENT DOCUMENTS

| | | | | |
|---|---|---|---|---|
| 5,131,827 | A | 7/1992 | Tasaka | |
| 10,407,605 | B2 | 9/2019 | Kim et al. | |
| 2007/0045823 | A1 | 3/2007 | Miller | |
| 2012/0193571 | A1 | 8/2012 | Lee | |
| 2013/0003416 | A1 | 1/2013 | Saga et al. | |
| 2014/0227492 | A1 | 8/2014 | Lee et al. | |
| 2017/0029682 | A1 * | 2/2017 | Kim ......................... | C08K 3/38 |
| 2017/0240727 | A1 * | 8/2017 | Van Der Burgt ....... | C08L 77/06 |

FOREIGN PATENT DOCUMENTS

| | | | |
|---|---|---|---|
| CN | 101891938 | A | 11/2010 |
| CN | 101899209 | A | 12/2010 |
| CN | 102304284 | A | 1/2012 |
| CN | 102719099 | A | 10/2012 |
| CN | 105837807 | A | 8/2016 |
| EP | 3 601 437 | * | 3/2018 |
| JP | 2009007552 | A | 1/2009 |
| JP | 2011020444 | A | 2/2011 |
| JP | 2011116842 | A | 6/2011 |
| KR | 20090088134 | A | 8/2009 |

OTHER PUBLICATIONS

Office Action issued in corresponding EP Application No. 21798646.2 dated Jun. 6, 2023 (7 pages).
Decision to Grant issued in corresponding EP Application No. 21798646.2 dated Jun. 26, 2025 (2 pages).
International Search Report issued for corresponding international patent application No. PCT/EP2021/079214, mailed Jan. 19, 2022 (3 pages).
Written Opinion issued for corresponding international patent application No. PCT/EP2021/079214, mailed Jan. 19, 2022 (6 pages).
Murphy J., in "Additives for Plastics Handbook", 2nd Edition, 2001, Chapter 5.2.3., p. 43-48—Elsevier Advanced Technology (8 pages).

(Continued)

*Primary Examiner* — Robert T Butcher

(74) *Attorney, Agent, or Firm* — Osha Bergman Watanabe & Burton LLP

(57) ABSTRACT

Described herein are polymer compositions including at least 20 wt. % of a liquid crystal polymer ("LCP"); 10 wt. % to 40 wt. % of a flat glass fiber and 15 wt. % to 50 wt. % of boron nitride and/or zinc oxide. It was surprisingly discovered that polymer compositions including an LCP in conjunction with a combination of flat glass fibers and boron nitride and/or zinc oxide had improved thermal conductivity and flexural properties, relative to analogous polymer compositions having round glass fibers in place of the flat glass fibers.

8 Claims, No Drawings

(56) References Cited

OTHER PUBLICATIONS

Hausrath R.L. et al., in "Fiberglass and Glass Technology", 2010, XIV, Chapter 5, p. 197-225—Wallenberger F.T. and BINGHAM P.A. (Editors) (29 pages).
Standard ASTM E1461, "Standard Test Method for Thermal Diffusivity by the Flash Method", 2013, p. 1-11 (11 pages).
Standard ASTM D790, "Standard Test Methods for Flexural Properties of Unreinforced and Reinforced Platics and Electrical Insulating Materials", 2003, p. 1-11 (12 pages).
Standard ASTM D3835, "Standard Test Method for Determination of Properties of Polymeric Materials by Means of a Capillary Rheometer", 2008, p. 1-11 (11 pages).

* cited by examiner

LIQUID CRYSTAL POLYMER COMPOSITIONS, ARTICLES AND METHODS OF MAKING

RELATED APPLICATIONS

This application is a national stage entry under 35 U.S.C. § 371 of International Application No. PCT/EP2021/079214 filed Oct. 21, 2021, which claims priority to U.S. application Ser. No. 63/105,416 filed on Oct. 26, 2020 and to European Application No. 21150658.9 filed on Jan. 8, 2021. The entire contents of these applications are explicitly incorporated herein by this reference.

FIELD

Polymer compositions are provided. The polymer compositions have excellent thermal conductivity and include a liquid crystal polymer ("LCP"), a flat glass fiber, and either or both of boron nitride and zinc oxide. Articles incorporating the polymer compositions as well as methods of making the polymer composition and articles are also provided.

BACKGROUND

As the power density of electrical components increases, so does thermal output of the electrical component, at least in part due to the resistance of the current carriers. The result is significantly increased heat accumulation in the electrical component. For example, there is a continuous demand to increase the power density in electric motors for electric vehicles (e.g. automobiles, motorcycles, boats and planes), concomitant with increasing consumer demand for higher performing vehicles. However, as power density increases, so does the heat accumulation in and around the electric motor, which can significantly reduce motor efficiency.

SUMMARY

In a first aspect, a polymer composition is provided that includes a liquid crystal polymer ("LCP") formed from the polycondensation of the following monomers: terephthalic acid, an aromatic diol, a first aromatic dicarboxylic acid, an aromatic hydrocarboxylic acid; 10 wt. % to 40 wt. % of a flat glass fiber; and boron nitride and/or zinc oxide, wherein the total concentration of boron nitride and zinc oxide is 15 wt. % to 50 wt. %. In some embodiments, the aromatic diol is 4,4'-biphenol, the aromatic hydrocarboxylic acid is 4-hydroxybenzoic acid, and the first aromatic dicarboxylic acid is isophthalic acid.

In some embodiments, the polymer composition is free of zinc oxide. In some embodiments, the polymer composition is free of boron nitride. In some embodiments, the polymer composition includes boron nitride and zinc oxide. In one such embodiment, the relative concentration of boron nitride to zinc oxide is from 0.5 to 2.

In some embodiments, the polymer composition has a through-plane thermal conductivity of from 0.20 W/m-K to 0.9 W/m-k, as measured according to ASTM E1461-13. In some embodiments, the polymer composition has a flexural strength of from 100 MPa to 250 MP, according to ASTM D790. In some embodiments, the polymer composition has a flexural strain of from 100 MPa to 190 MPa, as measured according to ASTM D790. In some embodiments, the polymer composition has an apparent viscosity of from 90 Pa·s to 300 Pa·s at shear rate of 100 $s^{-1}$; from 35 Pa·s to 150 Pa·s at a shear rate of 500 $s^{-1}$; or of from 25 Pa·s to 100 Pa·s at a shear rate of 1000 $s^{-1}$, as measured according to ASTM D3835.

In some embodiments, the polymer composition is free of round glass fibers.

In another aspect, an article comprising the polymer composition is provided, wherein the article is an electrical component. In some embodiments, the article is an electric motor component. In some embodiments, the article is a slot liner. In some embodiments, the article is selected from the group consisting of automotive components, aerospace components and watercraft components.

DETAILED DESCRIPTION

Described herein are polymer compositions including at least 20 wt. % of a liquid crystal polymer ("LCP"); 10 wt. % to 40 wt. % of a flat glass fiber and 15 wt. % to 50 wt. % of boron nitride and/or zinc oxide. It was surprisingly discovered that polymer compositions including an LCP in conjunction with a combination of flat glass fibers and boron nitride and/or zinc oxide had improved thermal conductivity and flexural properties, relative to analogous polymer compositions having round glass fibers in place of the flat glass fibers. As used herein, weight percent ("wt. %") is relative to the total weight of the polymer composition, unless explicitly stated otherwise.

Any description, even though described in relation to a specific embodiment, is applicable to and interchangeable with other embodiments of the present disclosure; where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and any recitation herein of numerical ranges by endpoints includes all numbers subsumed within the recited ranges as well as the endpoints of the range and equivalents.

Unless specifically limited otherwise, the term "alkyl", as well as derivative terms such as "alkoxy", "acyl" and "alkylthio", as used herein, include within their scope straight chain, branched chain and cyclic moieties. Examples of alkyl groups are methyl, ethyl, 1-methylethyl, propyl, 1,1 dimethylethyl, and cyclo-propyl. Unless specifically stated otherwise, each alkyl and aryl group may be unsubstituted or substituted with one or more substituents selected from but not limited to halogen, hydroxy, sulfo, C1-C6 alkoxy, C1-C6 alkylthio, C1-C6 acyl, formyl, cyano, C6 C15 aryloxy or C6-C15 aryl, provided that the substituents are sterically compatible and the rules of chemical bonding and strain energy are satisfied. The term "halogen" or "halo" includes fluorine, chlorine, bromine and iodine, with fluorine being preferred.

Similarly, unless specifically limited otherwise, the term "aryl" refers to a phenyl, indanyl or naphthyl group. The aryl group may comprise one or more alkyl groups, and are called sometimes in this case "alkylaryl"; for example may be composed of an aromatic group and two C1-C6 groups (e.g. methyl or ethyl). The aryl group may also comprise one or more heteroatoms, e.g. N, O or S, and are called sometimes in this case "heteroaryl" group; these heteroaromatic rings may be fused to other aromatic systems. Such heteroaromatic rings include, but are not limited to furanyl, thienyl, pyrrolyl, pyrazolyl, imidazolyl, triazolyl, isoxazolyl, oxazolyl, thiazolyl, isothiazolyl, pyridyl, pyridazyl, pyrimidyl, pyrazinyl and triazinyl ring structures. The aryl or heteroaryl substituents may be unsubstituted or substituted with one or more substituents selected from but not limited to halogen, hydroxy, C1 C6 alkoxy, sulfo, C1-C6 alkylthio, C1-C6 acyl, formyl, cyano, C6 C15 aryloxy or C6-C15 aryl, provided that the substituents are sterically compatible and the rules of chemical bonding and strain energy are satisfied.

The Polymer Composition

The polymer compositions include an LCP; 10 wt. % to 40 wt. % of a flat glass fiber and 15 wt. % to 50 wt. % of boron nitride and/or zinc oxide. The polymer compositions including an LCP in conjunction with a combination of flat glass fibers and boron nitride and/or zinc oxide surprisingly had improved thermal conductivity and flexural properties, relative to analogous polymer compositions having round glass fibers in place of the flat glass fibers. Additionally, in some embodiments, the polymer compositions had particularly desirable apparent viscosity for injection molding of thin-walled articles.

The polymer compositions had surprisingly improved thermal conductivity. As noted above, especially in high power density electrical component applications (e.g. electric motors for electric vehicles), there is a significantly increased thermal output, which results in heat accumulation in and around the electrical component. Therefore, there is a concomitant need to improve cooling. The polymer compositions described here have significantly improved thermal conductivity to help conduct heat away from electrical motor components. Of course, the same applies to any article (e.g. power supplies) that carries significant current or has large power density requirements. In some embodiments, the polymer composition has a through-plane thermal conductivity of at least 0.20 Watts per meter-Kelvin ("W/m-K"), at least 0.25 W/m-K, at least 0.3 W/m-K, at least 0.35 W/m-K, at least 0.4 W/m-K, at least 0.45 W/m-K, at least 0.5 W/m-K, at least 0.55 W/m-K or at least 0.6 W/m-K. In some embodiments, the polymer composition has a through-plane thermal conductivity of no more than 0.9 W/m-K or no more than 0.85 W/m-K. In some embodiments, the polymer composition has a through-plane thermal conductivity of from 0.2 W/m-K to 0.9 W/m-K, from 0.25 W/m-K to 0.9 W/m-K, from 0.3 W/m-K to 0.9 W/m-K, from 0.35 W/m-K to 0.9 W/m-K, from 0.4 W/m-K to 0.9 W/m-K, from 0.45 W/m-K to 0.9 W/m-K, from 0.5 W/m-K to 0.9 W/m-K, from 0.55 W/m-K to 0.9 W/m-K or from 0.6 W/m-K to 0.9 W/m-K. In some embodiments, the polymer composition has a through-plane thermal conductivity of from 0.2 W/m-K to 0.85 W/m-K, from 0.25 W/m-K to 0.85 W/m-K, from 0.3 W/m-K to 0.85 W/m-K, from 0.35 W/m-K to 0.85 W/m-K, from 0.4 W/m-K to 0.85 W/m-K, from 0.45 W/m-K to 0.85 W/m-K, from 0.5 W/m-K to 0.85 W/m-K, from 0.55 W/m-K to 0.85 W/m-K or from 0.6 W/m-K to 0.85 W/m-K. Through-plane thermal conductivity can be measured as described in the Examples section.

The polymer compositions also exhibited enhanced flexural properties. In some embodiments, the polymer composition has a tensile strength at break ("tensile strength") of from 100 MPa to 250 MPa, from 120 MPa to 250 MPa, from 130 MPa to 250 MPa, from 140 MPa to 250 MPa or from 150 MPa to 250 MPa. In some embodiments, the polymer composition has a tensile strength of from 100 MPa to 250 MPa, from 120 MPa to 220 MPa, from 130 MPa to 220 MPa, from 140 MPa to 220 MPa or from 150 MPa to 220 MPa. In some embodiments, the polymer composition has a tensile strength of from 100 MPa to 200 MPa, from 120 MPa to 200 MPa, from 130 MPa to 200 MPa, from 140 MPa to 200 MPa or from 150 MPa to 200 MPa. In some embodiments, the polymer composition has a tensile strength of from 100 MPa to 190 MPa, from 120 MPa to 190 MPa, from 130 MPa to 190 MPa, from 140 MPa to 190 MPa or from 150 MPa to 190 MPa. In some embodiments, the polymer composition has a tensile strain at break ("tensile strain") of from 1% to 3%, from 1.5% to 3% or from 1.8% to 3%. In some embodiments, the polymer composition has a tensile strain of from 1% to 2.5%, from 1.5% to 2.5% or from 1.8% to 2.5%. Tensile strength and tensile elongation can be measured as described in the Examples section.

In some embodiments, the polymer composition has an apparent viscosity ("η"), at a shear rate of 100 seconds$^{-1}$, ("s$^{-1}$") of from 90 Pa·s to 300 Pa·s, from 120 Pa·s to 300 Pa·s or from 150 Pa·s to 300 Pa·s. In some embodiments, the polymer compositions has an η, at a shear rate of 100 s$^{-1}$, of from 90 Pa·s to 250 Pa·s, from 120 Pa·s to 250 Pa·s or from 150 Pa·s to 250 Pa·s. In some embodiments, the polymer compositions has an η, at a shear rate of 500 s$^{-1}$, of from 35 Pa·s to 150 Pa·s, from 70 Pa·s to 150 Pa·s, from 35 Pa·s to 120 Pa·s, or from 70 Pa·s to 120 Pa·s. In some embodiments, the polymer compositions has an η, at a shear rate of 1000 s$^{-1}$, of from 25 Pa·s to 100 Pa·s, from 50 Pa·s to 100 Pa·s, from 25 Pa·s to 90 Pa·s or from 50 Pa·s to 90 Pa·s. η can be measured as described in the Examples section.

In some embodiments, the polymer composition has a melting temperature ("Tm") of at least 300° C., at least 320° C., or at least 340° C. In some embodiments, the polymer composition has a Tm of no more than 430° C., no more than 410° C., or no more than 400° C. In some embodiments, the polymer composition has a Tm of from 300° C. to 430° C., from 320° C. to 410° C., or from 340° C. to 400° C. Tm can be measured according to ASTM D3418.

The Liquid Crystal Polymer

The LCP is formed from the polycondensation of the following monomers: terephthalic acid, an aromatic diol, a first aromatic dicarboxylic acid distinct from terephthalic acid, and an aromatic hydroxycarboxylic acid. In some embodiments, at least one of the first aromatic dicarboxylic acid and aromatic hydroxycarboxylic acid are free of a napthyl group.

In some embodiments, the aromatic diol is represented by a formula selected from the following group of formulae:

$$HO—Ar_1—OH, \text{ and} \quad (1)$$

$$HO—Ar_2\text{-}T_1\text{-}Ar_3—OH, \quad (2)$$

wherein, $Ar_1$ to $Ar_3$ are independently selected $C_6$-$C_{30}$ aryl groups, optionally substituted with one or more substituents selected from the group consisting of halogen, a $C_1$-$C_{15}$ alkyl, and a $C_6$-$C_{15}$ aryl; and $T_1$ is selected from the group consisting of a bond, O, S, —$SO_2$—, —C(═O)—, and a $C_1$-$C_{15}$ alkyl. In some embodiments, the aromatic diol is selected from the group consisting of 1,3-dihydroxybenzene, 1,4-dihydroxybenzene, 2,5-biphenyldiol, 4,4'-biphenol, 4,4'-(propane-2,2-diyl)diphenol, 4,4'-(ethane-1,2-diyl)diphenol, 4,4'-methylenediphenol, bis(4-hydroxyphenyl)methanone, 4,4'-oxydiphenol, 4,4'-sulfonyldiphenol, 4,4'-thiodiphenol, naphthalene-2,6-diol, and naphthalene-1,5-diol. Preferably, the aromatic diol is 4,4'-biphenol.

In some embodiments, the first aromatic dicarboxylic acid is independently represented by a formula selected from the following group of formulae:

$$HOOC—Ar_1—COOH, \text{ and} \quad (3)$$

$$HOOC—Ar_2\text{-}T_2\text{-}Ar_3—COOH, \quad (4)$$

where $Ar_1$ to $Ar_3$ are given as above and are independently selected; and $T_2$ is selected from the group consisting of a bond, O and S. In some embodiments, the first aromatic dicarboxylic acid is selected from the group consisting of isophthalic acid, 4,4'-biphenyldicarboxylic acid, 4,4'-oxydibenzoic acid, 4,4'-(ethylenedioxy)dibenzoic acid, 4,4'-sulfanediyldibenzoic acid, naphthalene-2,6-dicarboxylic acid, naphthalene-1,4-dicarboxylic acid, naphthalene-1,5-dicarboxylic acid, and naphthalene-2,3-dicarboxylic acid. Preferably the first aromatic dicarboxylic acids is selected from the group consisting of isophthalic acid, naphthalene-2,6-dicarboxylic acid, naphthalene-1,4-dicarboxylic acid, naphthalene-1,5-dicarboxylic acid, and naphthalene-2,3-dicarboxylic acid. Most preferably, the first aromatic dicarboxylic acid is isophthalic acid.

In some embodiments, the aromatic hydroxycarboxylic acid is represented by a formula selected from the group consisting of $$HO—Ar_1—COOH, \text{ and} \quad (5)$$

$$HO—Ar_2—Ar_3—COOH, \quad (6)$$

wherein $Ar_1$ to $Ar_n$ are given above and are independently selected. In some embodiments, the aromatic hydroxycarboxylic acid is selected from the group consisting of 4-hydroxybenzoic acid, 3-hydroxybenzoic acid, 6-hydroxy-2-naphthoic acid, 6-hydroxy-1-naphthoic acid, 2-hydroxy-1-naphthoic acid, 3-hydroxy-2-naphthoic acid, 1-hydroxy-2-naphthoic acid, 5-hydroxy-1-naphthoic acid, and 4'-hydroxy-[1,1'-biphenyl]-4-carboxylic acid. Preferably, the aromatic hydroxycarboxylic acid is selected from the group consisting of 4-hydroxybenzoic acid, 6-hydroxy-2-naphthoic acid, 6-hydroxy-1-naphthoic acid, 2-hydroxy-1-naphthoic acid, 3-hydroxy-2-naphthoic acid, 1-hydroxy-2-naphthoic acid, and 5-hydroxy-1-naphthoic acid. Most preferably, the aromatic hydroxycarboxylic acid is 4-hydroxybenzoic acid.

In some embodiments, the LCP formed from the aforementioned monomers has recurring units $R_{LCP1}$ to $R_{LCP4}$. Recurring unit $R_{LCP1}$ is represented by the following formula:

(7)

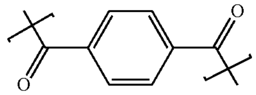

;

recurring unit $R_{LCP2}$ is represented by either one of the following formulae:

$$-[—O—Ar_1—O—]—, \text{ and} \quad (8)$$

$$-[—O—Ar_2\text{-}T_1\text{-}Ar_3—O—]—; \quad (9)$$

recurring unit $R_{LCP3}$ is represented by either one of the following formulae:

$$-[—OC—Ar_1—CO—]—, \text{ and} \quad (10)$$

$$-[—OC—Ar_2\text{-}T_2\text{-}Ar_3—CO—]—; \text{ and} \quad (11)$$

recurring unit $R_{LCP4}$ is represented by either one of the following formulae:

$$-[—O—Ar_1—CO—]—, \text{ and} \quad (12)$$

$$-[—O—Ar_2—Ar_3—CO—]—. \quad (13)$$

wherein $Ar_1$ to $Ar_3$, $T_1$ and $T_2$ are given above and are independently selected. The person of ordinary skill in the art will recognize that $R_{LCP1}$ according to formulae (7) is formed from terephthalic acid; $R_{LCP2}$ according to formulae (8) and (9) are respectively formed from monomers according to formulae (1) and (2); $R_{LCP3}$ according to formulae (10) and (11) are respectively formed from monomers according to formulae (3) and (4); and $R_{LCP4}$ according to formulae (12) and (13) are formed from monomers according to formulae (5) and (6). As such, the selection of $Ar_1$ to $Ar_3$, $T_1$ and $T_2$ for the monomers in formulae (1) to (6) also selects $Ar_1$ to $Ar_3$, $T_1$ and $T_2$ for recurring units $R_{LCP2}$ to $R_{LCP4}$. Preferably, recurring units $R_{LCP1}$ to $R_{LCP4}$ are respectively formed from the polycondensation of terephthalic acid, 4,4'-biphenol, isophthalic acid, and 4-hydroxybenzoic acid.

In some embodiments, the total concentration of recurring units $R_{LCP1}$ to $R_{LCP4}$ is at least 50 mol %, at least 60 mol %, at least 70 mol %, at least 80 mol %, at least 90 mol %, at least 95 mol %, at least 99 mol %, or at least 99.9 mol %. In some embodiments, the concentration of the terephthalic acid is from 5 mol % to 30 mol %, preferably from 10 mol % to 20 mol %. In some embodiments, the concentration of the aromatic diol is from 10 mol % to 30 mol %, preferably from 15 mol % to 25 mol %. In some embodiments, the concentration of the first aromatic dicarboxylic acid is from 1 mol % to 20 mol %, preferably from 1 mol % to 10 mol %. In some embodiments, the concentration of the aromatic hydrocarboxylic acid is from 35 mol % to 80 mol %, preferably from 45 mol % to 75 mol %, most preferably from 50 mol % to 17 mol %. In one embodiment, the $R_{LCP1}$ to $R_{LCP4}$ are, respectively, derived from terephthalic acid, 4,4'-biphenol, isophthalic acid and 4-hydroxybenzoic acid, where the concentration ranges for each recurring unit are within the ranges given above. As used herein, mol % of each recurring unit is relative to the total number of moles of recurring units in the polymer, unless explicitly indicated otherwise. For clarity, "derived from" refers the recurring unit formed from polycondensation of the recited monomer, for example, as described above with respect to the relationship between formulae 1 to 6 and 8 to 13.

In some embodiments, the LCP has a Tm of at least 310° C., at least 320° C., or at least 330° C. In some embodiments, the LCP has a Tm of no more than 390° C., no more than 380° C., or no more than 370° C. In some embodiments, the LCP has a Tm of from 310° C. to 390° C., from 320° C. to 380° C., or from 330° C. to 370° C.

In some embodiments, the LCP has a number average molecular weight ("Mn") of at least 5,000 g/mol. In some embodiments, the LCP has an Mn of no more than 20,000 g/mol. In some embodiments, the LCP has an Mn of from 5,000 g/mol to 20,000 g/mol. The number average molecular weight Mn can be determined by gel permeation chromatography (GPC) according to ASTM D5296 and using hexafluoroisopropanol solvent and poly(methyl methacrylate) standard.

In some embodiments, the LCP concentration in the polymer composition is at least 20 wt. %, at least 30 wt. %, at least 35 wt. % or at least 40 wt. %. In some embodiments, the LCP concentration in the polymer composition is no more than 80 wt. %, no more than 75 wt. % or no more than 70 wt. %. In some embodiments, the LCP concentration in the polymer composition is from 30 wt. % to 80 wt. %, from 30 wt. % to 75 wt. % or from 30 wt. % to 70 wt. %. In some embodiments, the LCP concentration in the polymer composition is from 35 wt. % to 80 wt. %, from 35 wt. % to 75 wt. % or from 35 wt. % to 70 wt. %. In some embodiments, the LCP concentration in the polymer composition is from 40 wt. % to 80 wt. %, from 40 wt. % to 75 wt. % or from 40 wt. % to 70 wt. %.

The LCP described herein can be prepared by any conventional method adapted to the synthesis of LCPs.

Boron Nitride or Zinc Oxide

The polymer composition includes boron nitride and/or zinc oxide. In some embodiments, the polymer composition includes either boron nitride or zinc oxide. In one such embodiment, the polymer composition includes boron nitride and is free of zinc oxide. In the other embodiment, the polymer composition includes zinc oxide and is free of boron nitride. In some embodiments, the polymer composition includes both boron nitride and zinc oxide. As used herein and unless explicitly stated otherwise, "free of" a component means that the concentration of the component in the polymer composition is no more than 1 wt. %, no more than 0.5 wt. %, no more than 0.1 wt. % or no more than 0.05 wt. %.

The total concentration of boron nitride and zinc oxide in the polymer composition is from 15 wt. % to 50 wt. %. In some embodiments, the total concentration of boron nitride and zinc oxide is at least 20 wt. %. In some embodiments, the total concentration of boron nitride and zinc oxide is no more than 45 wt. %, no more than 40 wt. %. In some embodiments, the total concentration of boron nitride and zinc oxide is from 15 wt. % to 45 wt. % or from 15 wt. % to 40 wt. %. In some embodiments, the total concentration of boron nitride and zinc oxide is from 20 wt. % to 50 wt. %, from 20 wt. % to 45 wt. % or from 20 wt. % to 40 wt. %. In embodiments including both boron nitride and zinc oxide, the relative concentration of the boron nitride to the zinc oxide (weight of boron nitride in the polymer composition/weight of zinc oxide in the polymer compositions) is from 0.5 to 2, from 0.75 to 1.3, from 0.80 to 1.2 or from 0.90 to 1.1. In embodiments including either boron nitride or zinc oxide, the boron nitride concentration or zinc oxide concentration, respectively, is within the same ranges as provided above with respect to the total concentration of boron nitride and zinc oxide.

The Flat Glass Fiber

The polymer composition further includes a flat glass fiber. Glass fibers are silica-based glass compounds that contain several metal oxides which can be tailored to create different types of glass. The main oxide is silica in the form of silica sand; the other oxides such as calcium, sodium and aluminum are incorporated to reduce the melting temperature and impede crystallization. The glass fibers may be added as endless fibers or as chopped glass fibers. All glass fiber types, such as A, C, D, E, M, S, R, T glass fibers (as described in chapter 5.2.3, pages 43-48 of Additives for Plastics Handbook, 2nd ed, John Murphy), or any mixtures thereof or mixtures thereof may be used. For example, R, S and T glass fibers are high modulus glass fibers that have typically an elastic modulus of at least 76, preferably at least 78, more preferably at least 80, and most preferably at least 82 GPa as measured according to ASTM D2343.

E, R, S and T glass fibers are well known in the art. They are notably described in Fiberglass and Glass Technology, Wallenberger, Frederick T.; Bingham, Paul A. (Eds.), 2010, XIV, chapter 5, pages 197-225. R, S and T glass fibers are composed essentially of oxides of silicon, aluminium and magnesium. In particular, those glass fibers comprise typically from 62-75 wt. % of SiO2, from 16-28 wt. % of Al2O3 and from 5-14 wt. % of MgO, based upon the total weight of the glass fibers. To the contrary of the regular E-glass fibers widely used in polymer compositions, R, S and T glass fibers comprise less than 10 wt. % of CaO, based upon the total weight of the glass composition.

Generally, the glass fiber has an aspect ratio, defined as the average ratio between the length and the largest of the width and thickness of at least 5, at least 10, at least 20 or at least 50. In some embodiments, the glass fiber has an average length of from 3 mm to 50 mm. In some such embodiments, the glass fiber has an average length of from 3 mm to 10 mm, from 3 mm to 8 mm, from 3 mm to 6 mm, or from 3 mm to 5 mm. In alternative embodiments, the glass fiber has an average length of from 10 mm to 50 mm, from 10 mm to 45 mm, from 10 mm to 35 mm, from 10 mm to 30 mm, from 10 mm to 25 mm or from 15 mm to 25 mm. The average length of the glass fiber can be taken as the average length of the glass fiber prior to incorporation into the polymer composition or can be taken as the average length of the glass fiber in the polymer composition.

The flat glass fibers are glass fibers that have a non-circular cross-section, including oval, elliptical or rectangular.

In some embodiments, the glass fiber has a cross-sectional longest diameter of at least 15 μm, preferably at least 20 μm, more preferably at least 22 μm, still more preferably at least 25 μm. Additionally or alternatively, in some embodiments, the glass fiber has a cross-sectional longest diameter of at most 40 μm, preferably at most 35 μm, more preferably at most 32 μm, still more preferably at most 30 μm. In some embodiments, glass fiber has a cross-sectional longest diameter from 15 μm to 35 μm, preferably from 20 to 30 μm and more preferably from 25 μm to 29 μm. In some embodiments, the glass fiber has a cross-sectional shortest diameter of at least 4 μm, preferably at least 5 μm, more preferably at least 6 μm, still more preferably at least 7 μm. Additionally or alternatively, in some embodiments, the glass fiber has a cross-sectional shortest diameter of at most 25 μm, preferably at most 20 m, more preferably at most 17 μm, still more preferably at most 15 μm. In some embodiments, the glass fiber has a cross-sectional shortest diameter of from 5 μm to 20 m, preferably from 5 μm to 15 μm and more preferably from 7 μm to 11 μm. In some embodiments, the glass fiber has an aspect ratio of at least 2, preferably at least 2.2, more preferably at least 2.4, still more preferably at least 3. The aspect ratio is defined as a ratio of the longest diameter in the cross-section of the glass fiber to the shortest diameter thereof. In some embodiments, the glass fiber has an aspect ratio of at most 8, preferably at most 6, more preferably of at most 4. In some embodiments, the glass fiber has an aspect ratio of from 2 to 6 or from 2.2 to 4.

The shape of the cross-section of the glass fiber, its length, its cross-sectional diameter and its aspect ratio can be easily determined using optical microscopy. For example, the aspect ratio of the fiber cross-section may be determined using an Euromex optical microscope and an image analysis software (Image Focus 2.5) by measuring the largest (width) and smallest (height) dimensions of the fiber cross-section and dividing the first number by the second number.

In some embodiments, the glass fibers have an elastic modulus of at least 76 GPa as measured according to ASTM C1557-03, of preferably at least 78, more preferably at least 80, even more preferably at least 82 and most preferably at least 84 GPa. In some embodiments, glass fibers have a tensile strength of at least 3.5 GPa as measured according to ASTM C1557-03, of preferably at least 3.6, more preferably at least 3.7, even more preferably at least 3.8 and most preferably at least 3.9 GPa. This level of elastic modulus and tensile strength is typically reached when using a specific chemical composition of the glass used to manufacture the glass fibers. Glass is a silica-based glass compound that contain several metal oxides which can be tailored to create different types of glasses. The main oxide is silica in the form of silica sand; the other oxides such as calcium, sodium and aluminum are incorporated to reduce the melting temperature and impede crystallization. It is well known in the art that when using a glass with a high loading of $Al_2O_3$, the glass fiber derived therefrom exhibit a high elastic modulus. In particular, those glass fibers comprise typically from 55-75 wt. % of $SiO_2$, from 16-28 wt. % of $Al_2O_3$ and from 5-14 wt. % of MgO, based on the total weight of the glass composition. To the contrary of the regular E-glass fibers widely used in polymer compositions, the high modulus glass fibers comprise less than 5 wt. % of $B_2O_3$, preferably less than 1 wt. %, based on the total weight of the glass composition.

The flat glass fiber concentration in the polymer composition is from 10 wt. % to 40 wt. %. In some embodiments, the flat glass fiber concentration in the polymer composition is from 10 wt. % to 35 wt. %, from 10 wt. % to 30 wt. %, from 15 wt. % to 40 wt. %, from 15 wt. % to 35 wt. % or from 15 wt. % to 30 wt. %, based on the total weight of the polymer composition.

Additives

In some embodiments, the polymer composition also includes an additive selected from the group consisting of additional reinforcing agents, tougheners, plasticizers, colorants, pigments, antistatic agents, dyes, lubricants, thermal stabilizers, light stabilizers, flame retardants, nucleating agents and antioxidants.

A large selection of additional reinforcing agents can be added to the polymer composition. The additional reinforcing agent can be selected from fibrous and particulate reinforcing agents. A fibrous reinforcing agent is considered herein to be a material having length, width and thickness, wherein the average length is significantly larger than both the width and thickness. Generally, such a material has an aspect ratio, defined as the average ratio between the length and the largest of the width and thickness of at least 5, at least 10, at least 20 or at least 50. In some embodiments, the fibrous reinforcing agents have an average length of from 3 mm to 50 mm. In some such embodiments, the fibrous reinforcing agents have an average length of from 3 mm to 10 mm, from 3 mm to 8 mm, from 3 mm to 6 mm, or from 3 mm to 5 mm. In alternative embodiments, the fibrous reinforcing agents have an average length of from 10 mm to 50 mm, from 10 mm to 45 mm, from 10 mm to 35 mm, from 10 mm to 30 mm, from 10 mm to 25 mm or from 15 mm to 25 mm. The average length of the fibrous reinforcing agents can be taken as the average length of the fibrous reinforcing agents prior to incorporation into the polymer composition or can be taken as the average length of the fibrous reinforcing agents in the polymer composition. Examples of fibrous reinforcing agents include, but not limited to, additional glass fibers (e.g. round glass fibers), carbon fibers, synthetic polymeric fibers, aramid fibers, aluminum fibers, titanium fibers, magnesium fibers, boron carbide fibers, rock wool fibers, and steel fibers. Round glass fibers are glass fibers having a substantially circular cross section (e.g. a cross section having perpendicular axes within the cross sectional plane that differ in length by no more than 5%, no more than 1%, or no more than 0.5%) Particulate reinforcing agents include, but not limited to, talc, mica, kaolin, calcium carbonate, calcium silicate, magnesium carbonate and wollastonite).

In some embodiments, the reinforcing agent concentration in the polymer composition is at least 15 wt. %, at least 20 wt. %, at least 25 wt. % or at least 30 wt. %. In some embodiments, the reinforcing agent concentration is no more than 45 wt. %. In some embodiments, the reinforcing agent concentration is from 20 wt. % to 45 wt. % or from 30 wt. % to 45 wt. %.

In some embodiments, the polymer composition is free of a reinforcing agent. In some embodiments, the polymer composition is free of additional glass fibers. In some embodiments, the polymer composition is free of round glass fibers. With respect to reinforcing agents (e.g. additional glass fibers or round glass fibers) free of means the concentration of the reinforcing agent is less than 10 wt. %, less than 5 wt. %, less than 1 wt. % or less than 0.5 wt. %.

The polymer composition may also comprise a toughener. A toughener is generally a low glass transition temperature (Tg) polymer, with a Tg for example below room temperature, below 0° C. or even below −25° C. As a result of its low Tg, the toughener are typically elastomeric at room temperature. Tougheners can be functionalized polymer backbones.

The polymer backbone of the toughener can be selected from elastomeric backbones comprising polyethylenes and copolymers thereof, e.g. ethylene-butene; ethylene-octene; polypropylenes and copolymers thereof; polybutenes; polyisoprenes; ethylene-propylene-rubbers (EPR); ethylene-propylene-diene monomer rubbers (EPDM); ethylene-acrylate rubbers; butadiene-acrylonitrile rubbers, ethylene-acrylic acid (EAA), ethylene-vinylacetate (EVA); acrylonitrile-butadiene-styrene rubbers (ABS), block copolymers styrene ethylene butadiene styrene (SEBS); block copolymers styrene butadiene styrene (SBS); core-shell elastomers of methacrylate-butadiene-styrene (MBS) type, or mixture of one or more of the above.

When the toughener is functionalized, the functionalization of the backbone can result from the copolymerization of monomers which include the functionalization or from the grafting of the polymer backbone with a further component.

Specific examples of functionalized tougheners are notably terpolymers of ethylene, acrylic ester and glycidyl methacrylate, copolymers of ethylene and butyl ester acrylate; copolymers of ethylene, butyl ester acrylate and glycidyl methacrylate; ethylene-maleic anhydride copolymers; EPR grafted with maleic anhydride; styrene copolymers grafted with maleic anhydride; SEBS copolymers grafted with maleic anhydride; styrene-acrylonitrile copolymers grafted with maleic anhydride; ABS copolymers grafted with maleic anhydride.

In some embodiments, the toughener concentration is at least 1 wt. %, at least 2 wt. % or at least 3 wt. %. Additionally or alternatively, in some embodiments the toughener concentration is no more than 30 wt. %, no more than 20 wt. %, no more than 15 wt. % or no more than 10 wt. %.

The polymer composition may also include other conventional additives commonly used in the art, including plasticizers, colorants, pigments (e.g. black pigments such as carbon black and nigrosine), antistatic agents, dyes, lubricants (e.g. linear low density polyethylene, calcium or magnesium stearate or sodium montanate), thermal stabilizers, light stabilizers, flame retardants, nucleating agents and antioxidants.

Preparation of the Polymer Composition

The polymer compositions can be prepared by melt-blending the LCP and the specific components (e.g. the flat glass fiber and the boron nitride or zinc oxide), and of any other additives.

Any suitable melt-blending method known in the art may be used for mixing polymeric ingredients and non-polymeric ingredients. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing agent presents a long physical shape (for example, a long glass fiber), drawing extrusion molding may be used to prepare a reinforced composition.

Articles and Applications

The polymer compositions can be desirably incorporated into articles. The article can notably be used in application settings where thin-walled articles are molded (e.g. injection molded) from the polymer composition.

As used herein a thin-walled article is an article that has a portion with a maximum thickness (along a line perpendicular to the surface at which the measurement is taken) of no more than 1 mm, no more than 0.9 mm, no more than 0.8 mm or no more than 0.7 mm. Preferably, the portion is a region on the surface of the article having an area of at least 1 $mm^2$, at least 10 $mm^2$, at least 100 $mm^2$, or at least 1000 $mm^2$.

In some embodiments, the article is an automotive component, an aerospace component or a watercraft component (including but not limited to boats and jet skis). In some embodiments, including but not limited to the aforementioned embodiments, the articles is an electrical component (e.g. an electrical automotive component). In some embodiments, the electrical component is in contact with, or includes, a current carrier. In some embodiments, including but not limited to the aforementioned embodiments, the article is an electric motor component (e.g. an electrical automotive motor component). In some embodiments, the article is a slot liner. Slot liners are incorporated into the stators or rotors of electric motors (including generators). Slot liners provide insulation between the stator core or motor core and, respectively, the stator windings or rotor winding. As mentioned above, the polymer compositions described herein are particularly desirable for high power density motor applications at least because of the significantly improved through-plane thermal conductivity. For clarity, the articles described above can be thin-walled articles or non-thin-walled articles. Preferably the articles are thin-walled articles.

Melt extrusion involves forcing molten polymer or polymer composition through a die or orifice. The molten polymer can be formed during melt-blending, as described above, or it can be formed by melting pre-formed polymer or polymer composition, for example, in the form of pellets. For injection molding applications, the molten polymer is forced into a mold, where it solidifies prior to being ejected (removed from the mold). In some embodiments where molten polymer is formed by melt-blending (e.g. extrusion), the mold can be directly or indirectly coupled to the melt-blending apparatus (e.g. extruder) such that the polymer composition is forced into the mold before significantly cooling. In other embodiments, solid pellets of polymer or polymer composition can be melted and the melting apparatus can be directly or indirectly coupled to the mold so that molten polymer or polymer composition can be fed into the mold. The mold corresponds to the shape of the article to be formed. As noted above, the polymer compositions have extremely desirable melt viscosities for injection molding applications, particularly with respect to thin-walled articles formed by injection molding.

The article can be printed from the polymer composition, by a process comprising a step of extrusion of the material, which is for example in the form of a filament, or comprising a step of laser sintering of the material, which is in this case in the form of a powder.

A method for manufacturing a three-dimensional (3D) object with an additive manufacturing system is also provided, comprising: providing a part material comprising the polymer composition, and printing layers of the three-dimensional object from the part material.

The polymer composition can therefore be in the form of a thread or a filament to be used in a process of 3D printing, e.g. Fused Filament Fabrication, also known as Fused Deposition Modelling (FDM).

The polymer composition can also be in the form of a powder, for example a substantially spherical powder, to be used in a process of 3D printing, e.g. Selective Laser Sintering (SLS).

Should the disclosure of any patents, patent applications, and publications, which are incorporated herein by reference conflict with the description of the present application to the extent that it may render a term unclear, the present description shall take precedence.

EXAMPLES

The following examples demonstrate the film forming capabilities and the dielectric and mechanical performance of the polymer compositions.

The following materials were used in the examples:

- LCP: A liquid crystal polymer formed from the following monomers: isophthalic acid; terephthalic acid; 4,4'-biphenol, p-hydroxybenzoic acid
- Flat Glass Fiber ("FGF"): Commercially obtained from Nitto Boseki Co., LTD (CSG 3PA-830).
- Round Glass Fiber ("RGF"): Commercially obtained from Saint-Gobain (910).
- Lubricant: Commercially obtained from Solvay Specialty Polymers Italy, S.p.A. under the trade name Polymist® F5A.
- Boron Nitride: Commercially obtained from Momentive (CF600 Boron Nitride]).
- Zinc Oxide: Commercially obtained from Dryteck (Pana-Tetra).

Example 1: Synthesis of LCP and Sample Formation

To synthesize the LCP, the dicarboxylic acid monomers (terephthalic acid (167.0 g, Flint Hills Resources), isophthalic acid (55.7 g, Lotte Chemicals), p-hydroxybenzoic acid (555.5 g, Sanfu), 4,4'-biphenol (201.6 g, SI Group) and acetic anhydride (769.2 g, Aldrich)) were charged into a 2-L glass reactor. Potassium acetate (0.07 g, Aldrich) and magnesium acetate (0.2 g, Aldrich) were used as catalysts. The mixture was heated to 165° C. and the acetylation reaction under reflux condition was allowed to proceed for 1 hr. The heating then continued to 300° C. at the rate of 0.5° C. per minute while distilling off acetic acid from the reactor. The pre-polymer was discharged and allowed to cool down. The material was then ground into powder for solid-state polymerization. The resin was advanced in a rotatory oven using the following profile: 1 hr at 220° C., 1 hr at 290° C. and 12 hrs at 310° C. under continuous nitrogen purging. The resulting high molecular resin had melt viscosity between 60-140 Pa·s at 370° C.

Samples were formed by melt blending the polymer compositions in an extruder and cut into pellets. Samples for thermal testing and mechanical testing were formed by injection molding. Sample parameters are displayed in Table 1. All values in Table 1 are in wt. %, and are based upon the total weight of the polymer composition.

TABLE 1

| Component | C1 | E1 | E2 | E3 | E4 | E5 | E6 | C2 | C3 | C4 | C5 |
|---|---|---|---|---|---|---|---|---|---|---|---|
| FGF | 29 | 20 | 20 | 20 | 20 | 20 | 20 | | | | |
| RGF | | | | | | | | 29 | 20 | 20 | 20 |
| LCP | 70 | 39 | 49 | 34 | 59 | 59 | 39 | 70 | 59 | 59 | 39 |
| Lubricant | 1.00 | 1.00 | 1.00 | 1.00 | 1.00 | 1.00 | 1.00 | 1.00 | 1.00 | 1.00 | 1.00 |
| Boron Nitride | | 40.00 | 30.00 | 20.00 | 20.00 | | 20.00 | | 20.00 | | 20.00 |
| ZnO | | | | 25.00 | | 20.00 | 20.00 | | | 20.00 | 20.00 |

Example 2: Thermal Performance, Mechanical Performance and Rheological Performance This Example demonstrates the thermal, mechanical and rheological performance of the samples.

To demonstrate thermal performance, through plane conductivity was measured by the flash method using a Netzsch LFA 467 HyperFlash instrument and according to ASTM E1461-13, "Standard Test Method for Thermal Diffusivity by the Flash Method". To demonstrate mechanical performance, flexural strength and flexural strain were measured according to ASTM D790. To demonstrate rheological performance, η (apparent viscosity) was measured according to ASTM D3835. The results of thermal, mechanical and rheological performance are displayed in Table 2.

TABLE 2

| Property | C1 | E1 | E2 | E3 | E4 | E5 | E6 | C2 | C3 | C4 | C5 |
|---|---|---|---|---|---|---|---|---|---|---|---|
| THERMAL PERFORMANCE | | | | | | | | | | | |
| Through-plane (W/m-K) | 0.20 | 0.85 | 0.54 | 0.77 | 0.38 | 0.25 | 0.61 | 0.29 | 0.35 | 0.24 | 0.64 |
| MECHANICAL PERFORMANCE | | | | | | | | | | | |
| Flexural Strength (MPa) | 182 | 117 | 154 | 125 | 151 | 157 | 132 | 173 | 144 | 152 | 131 |
| Flexural Strain (%) | 2.2 | 1 | 1.8 | 1.0 | 1.9 | 1.7 | 1.1 | 1.9 | 1.7 | 1.6 | 1 |
| RHEOLOGICAL PERFORMANCE | | | | | | | | | | | |
| Capillary Rheology at 370° C. | | | | | | | | | | | |
| Viscosity at 100 1/sec (Pa-s) | 70 | 234 | 194 | 218 | 155 | 91 | 201 | 132 | 217 | 153 | 324 |
| Viscosity at 500 1/sec, Pa-s | 20 | 110 | 71 | 74 | 73 | 37 | 78 | 53 | 99 | 55 | 120 |
| Viscosity at 1000 1/sec, Pa-s | 10 | 85 | 49 | 51 | 55 | 27 | 55 | 38 | 70 | 37 | 82 |

The samples having a combination of flat glass fiber and boron nitride had improved through-plane conductivity, flexural strength at break, and flexural strain at break, relative to samples having a combination of round glass fiber and boron nitride. Referring to Table 2, comparison of C1 and E4 demonstrates that the addition of boron nitride to a flat glass fiber filed LCP composition (E4) results in a through plane conductivity of 0.38 W/m-K, representing about a 90% improvement relative to an analogous LCP composition free of boron nitride (C1). Comparison of C2 and C3 demonstrates that addition of boron nitride to a round glass fiber filled LCP composition (C3) results in a through plane conductivity of only about 0.35 W/m-K, which is less than that for E4 and which represents only about a 21% improvement relative to an analogous LCP composition free of boron nitride (C2). Still further, while the addition of boron nitride in E4, relative to C1, and C3, relative to C2, decreases the flexural strength at break and flexural strain at break, E4 has improved flexural strength at break and flexural strain at break, relative to C3.

Similarly, the samples having a combination of flat glass fiber and zinc oxide had improved through-plane conductivity, flexural strength at break, and flexural strain at break, relative to samples having a combination of round glass fiber and zinc oxide. Referring to Table 2, comparison of C1 and E5 demonstrates that the addition of zinc oxide to a flat glass fiber filed LCP composition (E5) results in a through plane conductivity of 0.25 W/m-K, representing about a 25% improvement relative to an analogous LCP composition free of zinc oxide (C1). Comparison of C2 and C4 demonstrates that addition of zinc oxide to a round glass fiber filled LCP composition (C4) results in a through plane conductivity of only about 0.24 W/m-K, which is slightly less than that for E4 and which represents about a 17% reduction relative to an analogous LCP composition free of zinc oxide (C2). Still further, while the addition of zinc oxide in E5, relative to C1, and C4, relative to C2, decreases the flexural strength at break and flexural strain at break, E5 has improved flexural strength at break and flexural strain at break, relative to C4.

Still further, the samples having combination of flat glass fiber and both boron nitride and zinc oxide had improved flexural properties, while maintaining excellent through-plane conductivity, relative to samples have a combination of flat glass fiber and boron nitride alone. Referring to Table 2, comparison of E1 with E6 demonstrate that while the former had a higher through-plane conductivity, the latter had significantly improved flexural strength at break and improved flexural strain at break.

The embodiments above are intended to be illustrative and not limiting. Additional embodiments are within the inventive concepts. In addition, although descriptions of particular embodiments are provided, those skilled in the art will recognized that changes can be made in form and detail without departing from the spirit and scope of the invention. Any incorporation by reference of documents above is limited such that no subject matter is incorporated that is contrary to the explicit disclosure herein.

The invention claimed is:

1. A polymer composition consisting of:

at least 20 wt. % and at most 60 wt. %, based on the total weight of the polymer composition, of a liquid crystal polymer formed from the polycondensation of the following monomers: terephthalic acid, 4,4'-biphenol, isophthalic acid, and 4-hydroxybenzoic acid;

from 10 wt. % to 40 wt. %, based on the total weight of the polymer composition, of a flat glass fiber; and boron nitride and zinc oxide, wherein the total concentration of boron nitride and zinc oxide is from 15 wt. % to 50 wt. %, based on the total weight of the polymer composition;

optionally an additive selected from the group consisting of tougheners, plasticizers, colorants, pigments, antistatic agents, dyes, lubricants, thermal stabilizers, light stabilizers, nucleating agents, and antioxidants;

wherein the relative concentration of boron nitride to zinc oxide expressed as weight of boron nitride in the polymer composition/weight of zinc oxide in the polymer composition is from 0.5 to 2, wherein the flat glass fiber is E-glass fiber and the composition is free of additional glass fibers;

wherein the flat glass fiber has an aspect ratio of at least 2 and at most 8;

wherein the flat glass fiber has an average length of from 3 mm to 50 mm wherein the average length is the average length of the glass fiber prior to incorporation into the polymer composition or the average length of the glass fiber in the polymer composition; and wherein the composition has an apparent viscosity from 90 Pa.s to 300 Pa.s at a shear rate of 100 s-1, as measured according to ASTM D3835.

2. The polymer composition of claim 1, wherein the polymer composition has a through-plane thermal conductivity of from 0.20 W/m-K to 0.9 W/m-k, as measured by Laser Flash according to ASTM E1461-13.

3. The polymer composition of claim 1, wherein the polymer composition has a flexural strength of from 100 MPa to 250 MPa, according to ASTM D790.

4. The polymer composition of claim 1, wherein the polymer composition has a flexural strain of from 100 MPa to 190 MPa, as measured according to ASTM D790.

5. The polymer composition of claim 1, wherein polymer composition has an apparent viscosity of from 35 Pa.s to 150 Pa.s at a shear rate of 500 $s^{-1}$; or of from 25 Pa.s to 100 Pa.s at a shear rate of 1000 $s^{-1}$; as measured according to ASTM D3835.

6. The polymer composition of claim 1, wherein the concentration of the flat glass fiber is from 10 wt. % to 30 wt. %, based on the total weight of the polymer composition.

7. The polymer composition of claim 1, wherein the glass fiber has an aspect ratio, defined as the average ratio between the length and the largest of the width and thickness, of at least 5.

8. The polymer composition of claim 1, wherein the additive is selected from the group consisting of tougheners, plasticizers, colorants, antistatic agents, dyes, lubricants, thermal stabilizers, light stabilizers, nucleating agents, and antioxidants.

* * * * *